United States Patent Office 2,746,970
Patented May 22, 1956

---

2,746,970

2,2'-THIOBIS(4-ALKYL-5-THIAZOLE CARBOXYLIC ACID)

John J. D'Amico, Charleston, W. Va., assignor to Monsanto Chemical Company, St. Louis, Mo., a corporation of Delaware No Drawing. Application March 19, 1953,
Serial No. 343,508

6 Claims. (Cl. 260—302)

This invention relates to new compositions and to methods for their preparation. More particularly this invention relates to 2,2'-thiobis(4-alkyl-5-thiazole carboxylic acid).

Carboxylic acids having the carboxyl group linked directly to the 5-position of a thiazole ring readily lose $CO_2$ and are therefore relatively unstable substances. The 2-mercapto-4-alkyl-5-thiazole carboxylic acids have been known for many years. So far as is known the conversion of these substances to the 2,2'-thiobis(4-alkyl-5-thiazole carboxylic acid) has not heretofore been accomplished nor have these compounds been prepared even by indirect methods. The present invention provides a direct method for the preparation of the aforesaid compounds from the 2-mercapto-4-alkyl-5-thiazole carboxylic acids. The new compounds possess valuable properties rendering them useful for a number of important purposes.

*2,2'-dithiobis(4-methyl-5-thiazolecarboxylic acid)*

To an agitated suspension of 61 grams (0.347 mole) of 2-mercapto-4-methyl-5-thiazolecarboxylic acid in 300 ml. of water, was added a solution containing 87.5 grams (0.382 mole) of ammonium persulfate in 204 ml. of water over a period of 90 minutes while maintaining the temperature at 25–30° C. Stirring was continued for two hours longer, the precipitate collected by filtration and dried at 50° C. The product obtained in 99.5% yield was a white solid, M. P. 190–194° C. After recrystallization from ethyl alcohol the 2,2'-dithiobis(4-methyl-5-thiazolecarboxylic acid) melted at 198–199° C. Analysis gave 8.12% nitrogen and 36.92% sulfur. The values calculated for $C_{10}H_8N_2O_4S_4$ were 8.04% nitrogen and 36.81% sulfur. The compound was soluble in hot ethyl alcohol, slightly soluble in hot ethyl acetate, very slightly soluble in hot acetone but insoluble in water, ether, benzene, heptane and chloroform. The alkali metal and ammonium salts, however, are water soluble. Thus, the compound was dissolved in 25% aqueous caustic soda and reprecipitated by the addition of dilute sulfuric acid. This treatment must be carried out in the cold as even short times of heating in alkaline solution are sufficient to effect decarboxylation. Other metal salts, as for example zinc, iron, mercury, lead, cadmium, silver and nickel are prepared by admixing in aqueous solution a water soluble salt of the metal and a water soluble salt of the acid.

The compounds are characterized by the ability to take up additional sulfur on heating gently. For example heating one atomic weight portion of sulfur with one molecular proportion of 2,2'-dithiobis(4-methyl-5-thiazolecarboxylic acid) gave a composition corresponding to a trisulfide. Doubling the proportion of sulfur results in a composition corresponding to a tetrasulfide. The reaction may be carried out as follows:

To 6.4 grams of molten sulfur (0.2 atomic weight proportions) there was added 38.4 grams (0.1 molecular proportion) of 2,2'-dithiobis(4-methyl-5-thiazolecarboxylic acid). The addition was made over a period of 15 minutes while the molten sulfur was stirred. The mixture was then heated to 150–155° C. and stirred for 15 minutes, allowed to cool and the product crushed to a fine powder. The product melted at 75–85° C. It was insoluble in water, ether, acetone, chloroform, heptane, ethyl alcohol, benzene and ethyl acetate.

The new compounds are useful intermediates. They are also useful as such or in the form of their alkali metal or ammonium salts for destroying undesirable vegetation. This may be accomplished by applying a lethal concentration to the foliage of living plants or by applying the chemical to the ground before the plants emerge. A water dispersion is a convenient and economical form to use. The compounds exhibit general severe phytotoxic action when applied at the rate of 50 pounds per acre in pre-emergence application. At concentrations of 10 and 25 pounds per acre they exhibit selective action against weeds of the mustard family.

The compounds possess valuable accelerating action for the vulcanization of natural and synthetic rubber compositions such as butadiene polymers. The accelerating activity is enormously increased by the presence of a small amount of a basic activator, as for example diphenyl guanidine, di-o-tolyl guanidine or butylaldehyde-aniline. The presence of the carboxyl group apparently retards vulcanization markedly but the effect is not persistent and excellent physical properties are obtained at longer cures.

As illustrative of the vulcanizing activity a rubber composition was compounded comprising:

| | Parts by weight |
|---|---|
| Pale crepe rubber | 100 |
| Zinc oxide | 5 |
| Stearic acid | 1 |
| Sulfur | 3 |
| 2,2'-dithiobis(4-methyl-5-thiazolecarboxylic acid) | 0.7 |
| Diphenyl guanidine | 0.3 |

The stock was vulcanized by heating for 60 minutes in a press at 135° C. The modulus and tensile properties of the vulcanizate are set forth below:

| Modulus of Elasticity in lbs./in.² at Elongation of 700 percent | Tensile at Break in lbs./in.² | Ultimate Elongation, percent |
|---|---|---|
| 1,765 | 3,200 | 815 |

In addition the resistance of the unvulcanized composition to premature vulcanization was evaluated by means of a Mooney plastometer. The scorch point was taken at the point at which the plasticity curve began to rise sharply. At 121° C. the scorch time was 17 minutes and at 135° C. 9 minutes. This compares to scorch times of 12 and 7 minutes at the aforesaid temperatures for 2,2'-dithiobis benzothiazole 0.67 and diphenyl guanidine 0.3 part as the accelerating component in the same base formula. 2,2'-dithiobis benzothiazole is a widely used commercial accelerator. The accelerating action of the new compounds is also especially effective in isobutylene polymers containing small amounts of diene copolymerized therewith. The commercial designation of this type copolymer is Butyl rubber.

It is intended to cover all changes and modifications of the examples of the invention herein chosen for purposes of disclosure which do not constitute departures from the spirit and scope of the invention.

What is claimed is:

1. A compound of the structure

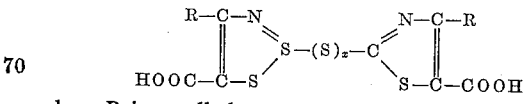

where R is an alkyl group and $x$ is an integer.

2. A compound of the structure

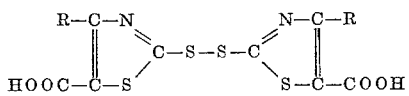

where R is an alkyl group of less than five carbon atoms.

3. A compound of the structure

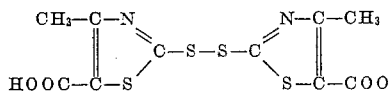

4. A method of making a 2,2'-dithiobis(4-alkyl-5-thiazolecarboxylic acid) which comprises oxidizing a 2-mercapto-4-alkyl-5-thiazolecarboxylic acid.

5. The method of making a 2,2'-dithiobis(4-alkyl-5-thiazolecarboxylic acid) which comprises oxidizing in aqueous suspension a 2-mercapto-4-alkyl-5-thiazolecarboxylic acid.

6. The method of making 2,2'-dithiobis(4-methyl-5-thiazolecarboxylic acid) which comprises suspending 2-mercapto-4-methyl-5-thiazolecarboxylic acid in water and oxidizing by means of a persulfate.

References Cited in the file of this patent

UNITED STATES PATENTS

| | | |
|---|---|---|
| 2,109,698 | Harman | Mar. 1, 1938 |
| 2,196,607 | Mathes | Apr. 9, 1940 |
| 2,381,397 | Smith | Aug. 7, 1945 |
| 2,468,952 | Beber | May 3, 1949 |
| 2,603,646 | Mathes | July 15, 1952 |
| 2,603,647 | Gregory | July 15, 1952 |

OTHER REFERENCES

Rumpf: Chem. Abst., vol. 38, col. 2951 (1944).
Stampfli: Chem. Abst., vol. 39, col. 1430 (1945).
D'Amico: JACS, vol. 75, pp. 102–4 (1953).